(12) United States Patent
Katorgin et al.

(10) Patent No.: US 6,415,596 B1
(45) Date of Patent: Jul. 9, 2002

(54) METHOD FOR INCREASING THE SPECIFIC IMPULSE IN A LIQUID-PROPELLANT ROCKET ENGINE AND ROCKET POWDER UNIT FOR REALISING THE SAME

(75) Inventors: Boris Ivanovich Katorgin; Felix Jurievich Chelkis; Igor Grigorievich Storozhenko, all of Khimki; Sergei Prokopievich Chernykh, Moscow; Oleg Efimovich Batalin, Saint Petersburg; Evgeny Shmerovich Finkelshtein, Moscow; Alexandr Grigorievich Liakumovich, Kazan; Benyamin Sinaevich Strelchik, Novokuibyshevsk; Vladimir Serapionovich Anufriev, Moscow, all of (RU)

(73) Assignee: Otkrytoe Aktsionernoe Obschestvo "NPO Energomash imeni akademika V.P., Moskovaskaya oblast (RU)

(*) Notice: Subject to any disclaimer, the term of this patent is extended or adjusted under 35 U.S.C. 154(b) by 0 days.

(21) Appl. No.: 09/744,627

(22) PCT Filed: Jun. 22, 1999

(86) PCT No.: PCT/RU99/00208
§ 371 (c)(1),
(2), (4) Date: Mar. 15, 2001

(87) PCT Pub. No.: WO00/06883
PCT Pub. Date: Feb. 10, 2000

(30) Foreign Application Priority Data

Jul. 28, 1998 (RU) ............................................. 98114746

(51) Int. Cl.[7] ................................................. F02K 9/72

(52) U.S. Cl. ........................ 60/205; 60/257; 60/39.461

(58) Field of Search ..................... 60/205, 257, 39.461

(56) References Cited

U.S. PATENT DOCUMENTS

| 3,097,479 A | 7/1963 | Reipold |
| 3,127,735 A | 4/1964 | Bauerie et al. |
| 3,128,597 A | 4/1964 | Smith et al. |
| 3,230,700 A | 1/1966 | Larsen |

FOREIGN PATENT DOCUMENTS

| RU | 2044032 | 9/1995 |
| RU | 2133367 | 7/1999 |

OTHER PUBLICATIONS

"Kosmonavtika" encyclopedia, chief editor V.P. Glushko, Moscow, 1985, p. 331, article RD–301 (with translation).
"Kosmonavtika" encyclopedia, chief editor V.P. Glushko, Moscow, 1985, p. 327, article RD–107 (with translation).
"Kosmonavtika" encyclopedia, chief editor, V.P. Glushko, Moscow, 1985, p. 444, article N–1 (with translation).
"Kosmonavtika" encyclopedia, chief editor V.P. Glushko, Moscow, 1985, p. 322, article "Rocket Power Unit" (with translation).

(List continued on next page.)

Primary Examiner—Ehud Gartenberg
(74) Attorney, Agent, or Firm—Fish & Richardson P.C.

(57) ABSTRACT

The present invention pertains to the field of rocketry and more precisely to liquid-propellant rocket engines and to rocket power units. This invention essentially relates to a method for increasing the specific impulse in a liquid-propellant rocket engine by using oxygen as well as a hydrocarbon fuel consisting of dicyclobutyl ($C_8H_{14}$). The dicyclobutyl provides for a substantial increase in the specific impulse of the liquid-propellant rocket engine when compared with kerosene. This invention also relates to a power unit for a rocket that has tanks for liquid oxygen and for the hydrocarbon fuel. Since the fuel tank is filled with dicyclobutyl ($C_8H_{14}$), it is thus possible to increase the thrust, the specific impulse, as well as the in-flight operation duration of the engine, and to reduce the weight of the tanks without any substantial change in the circuits of the liquid-propellant rocket engine and of the rocket power unit.

4 Claims, 2 Drawing Sheets

OTHER PUBLICATIONS

Zrelov, V.N. et al., "Zhidkie raketnye topliva [Liquid Rocket Propellants]" Moscow, Khima, 1975 pp. 78–79, 102 (with translation).
"Launch Vehicles" (ed. Prof. S.O. Osipov), Moscow, 1981, Voenizdat, Chapter 6, pp. 202–203 (with translation).
"Kosmonavtika" encyclopedia, chief editor V.P. Glushko, Moscow, 1985, p. 346, article "Saturn" (with translation).
Rocket–space corporation Enery named after S.P. Korolev, ed. Seminov Yu.P., 1996, pp. 121–122 (with translation).
International Search Report; PCT/RU99/00208; Oct. 1999.
"Kosmonavtika" encyclopedia, Moscow, 1985, pate 218, article LR–105–NA.
"Kosmonavtika" encyclopedia, Moscow, 1985, p. 331, article RD–301.
"Kosmonavtika" encyclopedia, Moscow, 1985, p. 327, article RD–107.
"Rocket power unit", p. 346, article "Saturn", p. 444, article N–1.
"Kosmonavtika" encyclopedia, chief editor V.P. Glushko, Moscow, 1985, p. 322.

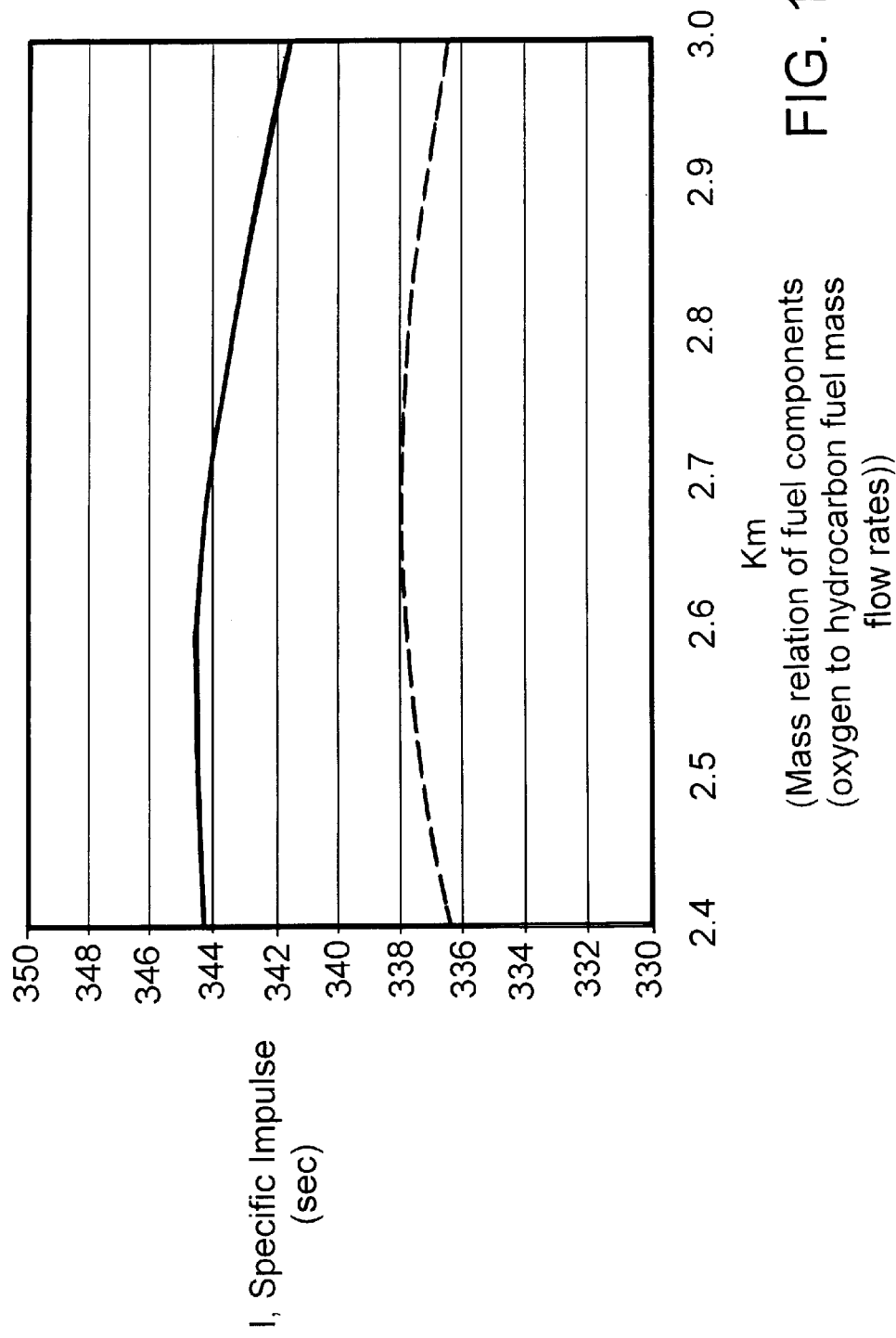

METHOD FOR INCREASING THE SPECIFIC IMPULSE IN A LIQUID-PROPELLANT ROCKET ENGINE AND ROCKET POWDER UNIT FOR REALISING THE SAME

TECHNICAL FIELD

The present invention relates to the field of rocketry and, more specifically, to power units with liquid-propellant rocket engines.

BACKGROUND

Known in the art and widely used in launch vehicles for various applications are liquid-propellant rocket engines operating on liquid oxygen and such hydrocarbon fuel, as kerosene. These fuel components are used, for instance, by US liquid-propellant rocket engine LR-105-NA (see the "Kosmonavtika" encyclopedia, Moscow, 1985, page 218, article LR-105-NA). This engine has a specific impulse of 2153 m/s on the ground, and 3025 m/s in vacuum. Let us assume that the method of getting the specific impulse from interaction of the aforesaid fuel components in the LR-105-NA liquid-propellant rocket engine is analogous to the method disclosed in the present invention. The disadvantage of the known method consists in that it fails to use a considerable reserve for increasing the specific impulse of the liquid-propellant rocket engine which could be exploited by finding a more effective hydrocarbon fuel than kerosene.

Known in the art is liquid-propellant rocket engine RD-301 of the GDL-OKB design (see the "Kosmonavtika" encyclopedia, Moscow, 1985, page 331, article RD-301). This engine uses liquid fluorine as oxidant and liquid ammonia as fuel. The engine specific impulse in vacuum is equal to 3928 m/s.

Let us assume that the method of getting the specific impulse from interaction of the aforesaid fuel components in the RD-301 liquid-propellant rocket engine is analogous to the method disclosed in the present invention. The known method is deficient in that the use of such effective fuel components as ammonia and fluorine in the aforesaid engine calls for a considerable sophistication of the design of many of its accessories, units and components as compared with a similar engine operating on a combination of liquid oxygen and such hydrocarbon fuel as kerosene. Besides, what with today's technological level in rocketry, the use of the known method for increasing the engine specific impulse would tend to raise the cost of research and development work and, in the final count, would make the accomplishment of concrete projects too expensive.

US patents also disclose a number of technical solutions pertaining to the improvement of fuel components for liquid-propellant rocket engines. Specifically, this problem is dealt with in the inventions disclosed in U.S. Pat. Nos. 3,097,479, 3,127,735, 3,230,700, which are also assumed here as analogous to the method disclosed in the present invention. The aforesaid analogous art gives no indication of the use of fuel in liquid oxygen rocket engines that would be similar to kerosene, but provide a higher specific impulse.

Liquid oxygen and kerosene are used as fuel components by known liquid-propellant rocket engine RD-107 of the GDL-OKB design (see the "Kosmonavtika" encyclopedia, Moscow, 1985, pages 327–329, article RD-107). This engine has a specific impulse of 2520 m/s on the ground, and 3080 m/s in vacuum. We shall assume the method of getting the aforesaid specific impulse from the interaction of the aforementioned fuel components used in the RD-107 liquid-propellant rocket engine as the prototype of the proposed method in the present invention. The shortcoming of this prior art method consists in that it fails to exploit the available reserve for improving the specific impulse of the liquid-propellant rocket engine by using a hydrocarbon fuel that would be more effective than kerosene and would not call for any essential and radical changes in the engine design.

Recent years have been marked by the increasing popularity of rocket power units with liquid-propellant rocket engines. A power unit of this kind was described, for instance, in the monograph "Launch vehicles" (ed. Prof. S. O. Osipov), Moscow, 1981, Voenizdat, Chapter 6, pages 202–203. FIG. 6.1 of this monograph illustrates diagrammatically a power unit with a turbo-pump system for supply of fuel components. This power unit includes a liquid-propellant rocket engine comprising a turbo-pump system for supply of oxidant and fuel, an oxidant tank and a fuel tank, as well as automatic control system components. The fuel tank is filled with the required quantity of fuel, whereas the oxidant tank carries the required quantity of oxidant.

Let us assume that this power unit is analogous to the proposed rocket power unit. The analogous art is deficient in that it fails to indicate definite fuel components for which the power unit in question was designed, wherefore the efficiency of said power unit cannot be evaluated.

Known in the art is a $1^{st}$ stage power unit of the American Saturn-I launch vehicle (see the "Kosmonavtika" encyclopedia, chief editor V. P. Glushko, Moscow, 1985, page 322, article "Rocket power unit"; page 346, article "Saturn"; and page 444, article "N-1").

This 1st stage power unit consists of 8 liquid-propellant rocket engines N-1 and runs on two-component fuel (the oxidant being liquid oxygen). The engine is provided with a turbo-pump fuel supply system. The rocket engine power unit in question also comprises oxidant and fuel tanks and automatic control equipment. The oxidant tank is filled with the required amount of liquid oxygen, whereas the fuel tank carries the corresponding amount of hydrocarbon fuel (kerosene).

We shall assume this technical solution to be analogous to the proposed rocket power unit. The prior art is deficient in that the fuel tank in the known power unit is filled with kerosene which is not the best fuel for this unit.

Known in the art is a $1^{st}$ rocket power unit of the R-9 intercontinental ballistic missile which uses fuel consisting of two main components, oxygen and kerosene (see the book entitled "Rocket-space corporation Energy named after S. P. Korolev", ed. Semionov Yu. P., 1996, pages 121 and 122).

The oxidant tank of the R-9 missile is filled with the required amount of liquid oxygen, whereas the fuel tank carries the corresponding amount of hydrocarbon fuel (kerosene).

We shall assume this technical solution to be the prototype of the proposed rocket power unit. The prototype is deficient in that its fuel tank is filled with kerosene which is not the best fuel for this unit, as the specific impulse in its liquid-propellant rocket engine can be higher.

SUMMARY

It is an object of the present invention to identify a hydrocarbon fuel which would have physical, chemical and service properties approximating to those of kerosene and make it possible to increase the specific impulse in the liquid-propellant rocket engine using liquid oxygen and kerosene as fuel components without appreciable changes in its design.

This task was prompted by the feasibility of effective renovation of liquid-propellant rocket engines and rocket power units with such engines operating on oxygen-kerosene fuel components.

The results of theoretical and experimental studies have shown that a combination of hydrocarbon fuel having a polycyclic structure with oxygen may increase the heating capacity of fuel due to the optimization of the carbon-hydrogen ratio in fuel and the enthalpy of its formation from these elements.

The hydrocarbon fuel sought is dicyclobutyl ($C_8H_{14}$) which, when used with liquid oxygen, may increase the specific impulse in the RD-107 liquid-propellant rocket engine mentioned above by approximately 2%.

The essence of the disclosed method for increasing the specific impulse in a liquid-propellant rocket engine consists in that the liquid-propellant rocket engine designed for operation on oxygen and liquid hydrocarbon fuel is supplied with liquid oxygen as oxidizer and dicyclobutyl ($C_8H_{14}$) as hydrocarbon fuel. The physical, chemical and service properties of dicyclobutyl (high density, boiling and freezing points, thermal stability, cooling properties) come near to those of kerosene thereby making it a good substitute.

As regards liquid-propellant rocket engines, the proposed method has the advantage of increasing the engine specific impulse over the methods of operating engines on liquid oxygen and kerosene. It is worth noting that such a hydrocarbon fuel as methane with oxygen provides even a higher specific impulse than dicyclobutyl, but its use calls for essential changes in the design of oxygen-kerosene rocket engines.

The Table that follows presents estimated impulse values against mass relations of fuel components (oxidant to fuel) Km at a pressure of 260 kgf/cm² in the combustion chamber with nozzle area geometric expansion being equal to 36.9. In this table the column "Dicyclobutyl" presents impulse values for fuel components liquid oxygen—dicyclobutyl, and the column "Kerosene", impulse values for fuel components liquid oxygen—kerosene. These values have been mainly defined for type RD-107 liquid-propellant rocket engines with generator gas afterburning in the chamber.

TABLE

| No. | Km | Dicyclobutyl | Kerosene |
|---|---|---|---|
| 1 | 2.4 | 344.3 | 336.42 |
| 2 | 2.425 | 344.325 | 336.6275 |
| 3 | 2.45 | 344.35 | 336.835 |
| 4 | 2.475 | 344.375 | 337.0425 |
| 5 | 2.5 | 344.4 | 337.25 |
| 6 | 2.525 | 344.425 | 337.37 |
| 7 | 2.55 | 344.45 | 337.49 |
| 8 | 2.575 | 344.475 | 337.61 |
| 9 | 2.6 | 344.5 | 337.73 |
| 10 | 2.625 | 344.375 | 337.7675 |
| 11 | 2.65 | 344.26 | 337.805 |
| 12 | 2.675 | 344.125 | 337.8425 |
| 13 | 2.7 | 344 | 337.88 |
| 14 | 2.725 | 343.825 | 337.835 |
| 15 | 2.75 | 343.65 | 337.79 |
| 16 | 2.775 | 343.475 | 337.745 |
| 17 | 2.8 | 343.3 | 337.7 |
| 18 | 2.825 | 343.1 | 337.5675 |
| 19 | 2.85 | 342.9 | 337.435 |
| 20 | 2.875 | 342.7 | 337.3025 |
| 21 | 2.9 | 342.5 | 337.17 |
| 22 | 2.925 | 342.25 | 336.9525 |
| 23 | 2.95 | 342 | 336.735 |
| 24 | 2.975 | 341.75 | 336.5175 |
| 25 | 3 | 341.5 | 336.3 |

The table shows that the specific impulse in oxygen rocket engines of similar design increases by approximately 2% when they use dicyclobutyl instead of kerosene.

In some applications the best mass relations of fuel components (oxidant to fuel) for high and medium power liquid-propellant rocket engines fall within an interval of 2.4 to 3. These relations are advantageous, as they provide the highest values of the specific impulse in the corresponding rocket engines. However, the table also shows that other relationships of fuel components, e.g. 2 or 3.5, need not be disregarded either, though they may lead sometimes to a substantial decrease of the advantages of the proposed method.

In other particular applications of the disclosed method the pressure in the combustion chamber of liquid-propellant rocket engines must be maintained within a range of 50 to 300 kgf/cm². At lower, though also possible, pressures in the combustion chamber it is difficult to attain desired high values of the specific impulse, whereas pressures exceeding the maximum limit of the indicated range may affect the performance of certain engine components for strength reasons.

The technical result of the disclosed method consists in the identification of hydrocarbon fuel dicyclobutyl ($C_8H_{14}$) which possesses physical, chemical and service properties approximating to those of kerosene and, when used jointly with liquid or gaseous oxygen as oxidizer, makes it possible to increase the specific impulse of the liquid-propellant rocket engine by approximately 2% as compared with the oxygen-kerosene rocket engine (see also the Table presented above).

Another technical result of the disclosed method consists in the identification of a fuel for hydrocarbon-oxygen rocket engines that does not call for any essential changes in engines operating on oxygen-kerosene fuel.

The object of the proposed rocket power unit was to supply the liquid-propellant rocket engine of a rocket power unit with a fuel that would enable the engine to develop a higher specific impulse in an oxygen liquid-propellant rocket engine than kerosene and yet come near to kerosene in its physical, chemical and technical properties.

The essence of the invention "Rocket power unit for realizing the method" consists in that the disclosed power unit comprises at least one liquid-propellant rocket engine, oxidant and fuel tanks, a system (systems) for supply of oxidant and fuel, as well as automatic equipment accessories, said oxidant tank being filled with the required quantity of oxygen, preferably liquid, and said fuel tank being filled with the required quantity of dicyclobutyl ($C_8H_{14}$). In principle, the aforesaid tanks may be filled with fuel components to capacity.

In one of the embodiments of the invention the temperature of dicyclobutyl in the tank varies from −50° C. to +50° C.

The technical result of the implementation of the disclosed invention consists in a possibility of increasing the liquid-propellant rocket engine specific impulse, thrust and in-flight operating time, or reducing the weight of the tanks (both empty and full) without essential changes in the designs of the liquid-propellant rocket engine and the rocket power unit.

DESCRIPTION OF DRAWINGS

FIG. 1 shows specific impulse I as a function of relationship Km of fuel components oxygen-kerosene and oxygen-dicyclobutyl.

DETAILED DESCRIPTION

Figure 3:
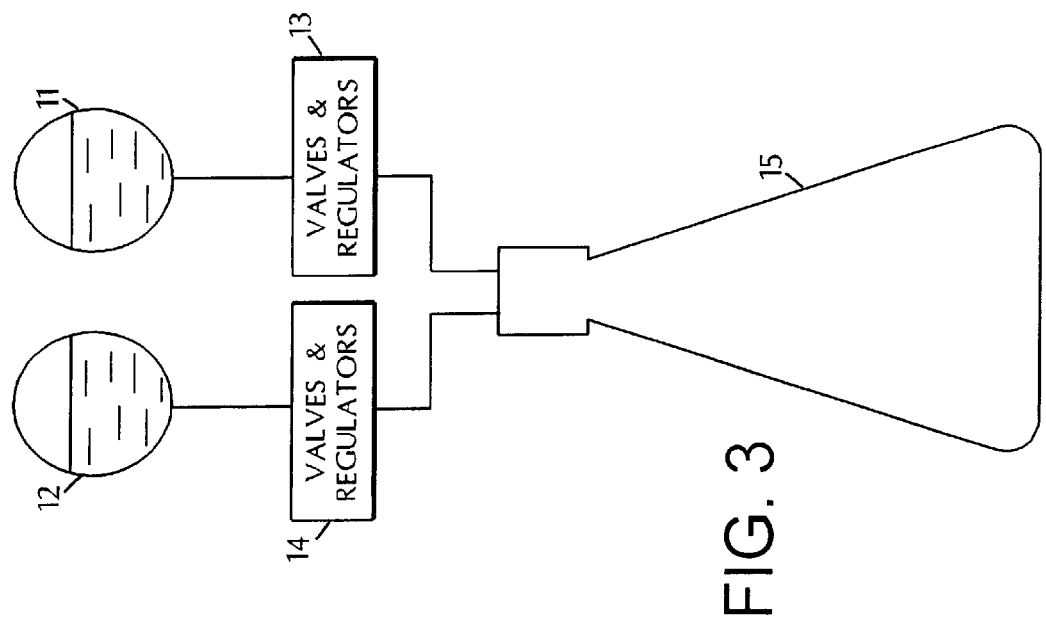
FIG 3 illustrates a rocket power unit with a bottle-type fuel supply system.

Let us now discuss various applications of the disclosed method for increasing the specific impulse in a liquid-propellant rocket engine.

EXAMPLE 1

A liquid-propellant rocket engine is supplied with liquid oxygen and dicyclobutyl. Mass relation of fuel components (oxidant to fuel). Pressure in combustion chamber $P_{in}$=50 kgf/cm$^2$. Single-chamber engine. Turbo-pump fuel supply system. Rated thrust 50 tf. Specific impulse in vacuum 357 s. (A similar engine running on kerosene has a specific impulse of 350 s).

EXAMPLE 2

Same as in Example 1, except that the liquid-propellant rocket engine has two chambers.

Km=2.6

$P_{in}$=260 kgf/cm$^2$.

Rated thrust 400 tf.

Specific thrust on the ground 344.5 s. (A similar engine running on kerosene has a specific impulse of 337.73 s).

EXAMPLE 3

Same as in Example 1,

Km=2.6

$P_{in}$=30 kgf/cm$^2$.

Bottle fuel supply system.

Engine rated thrust 100 kgf/cm$^2$.

Specific impulse in vacuum 357 s. (A similar engine running on kerosene has a specific impulse of 350 s).

EXAMPLE 4

Same as in Example 1, except

Km=3

$P_{in}$=300 kgf/cm$_2$.

Rated thrust 230 tf.

Specific impulse in vacuum 357 s. (A similar engine running on kerosene has a specific impulse of 350 s).

The examples presented above show that the use of dicyclobutyl in the capacity of hydrocarbon rocket fuel for a liquid-propellant rocket engine instead of kerosene makes it possible to increase the specific impulse in the engine by approximately 2%. The curves of specific impulse I versus mass relation of fuel components Km (oxygen to hydrocarbon fuel mass flow ratio) for values Km from 2.4 to 3 at a combustion chamber pressure of 260 kgf/cm$_2$ and nozzle area geometric expansion of 36.9 presented in FIG. 1 clearly illustrate great advantages of dicyclobutyl over kerosene in terms of the specific impulse in a liquid-propellant rocket engine.

It is worth noting that dicyclobutyl can also be used instead of kerosene in three-component liquid-propellant rocket engines.

If need be, dicyclobutyl may be doped with various inhibitors, stabilizers and other agents improving the storage and operating properties of the fuel component.

In principle, fuel components in the proposed method can be used not only in a liquid, but also in a gaseous state.

Let us now turn to specific embodiments of the disclosed rocket power unit.

Figure 2:
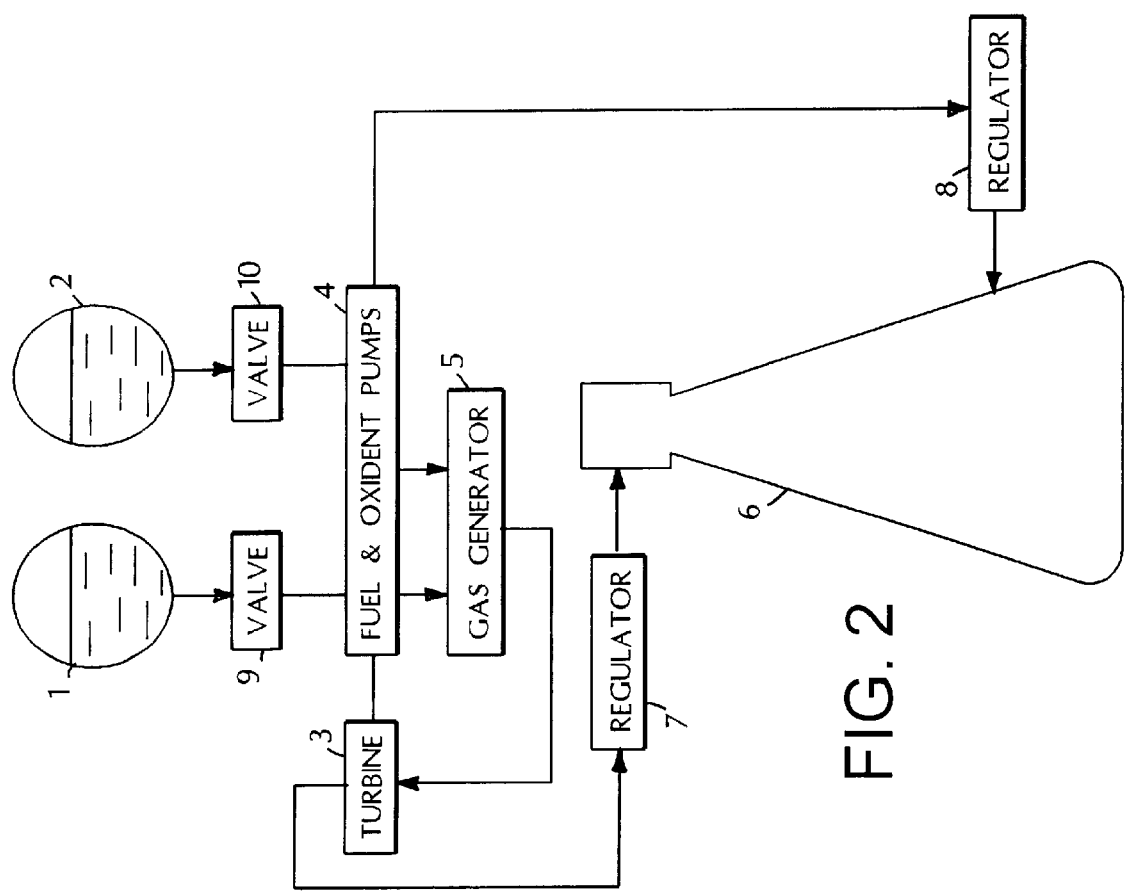
FIG. 2 illustrates a rocket power unit with a liquid-propellant rocket engine having a turbo-pump fuel supply system.

Such embodiments illustrating possible design solutions for a rocket power unit are illustrated in FIG. 2 and FIG. 3.

In FIG. 2: 1—fuel tank; 2—oxidant tank; 3,4—turbo-pump unit in which 3 is a turbine, and 4 is fuel and oxidant pumps; 5—gas generator; 6—combustion chamber of liquid-propellant rocket engine; 7, 8, 9 and 10—valves and regulators of the automatic equipment.

In FIG. 3: 11—fuel tank; 12—oxidant tank; 13 and 14—valves and regulators of automatic equipment; 15—combustion chamber of liquid-propellant rocket engine.

The rocket power unit is characterized in that the tank with dicyclobutyl is hydraulically connected to the inlet fuel supply line of the liquid-propellant rocket engine starting from valve 9. Significantly, the designs of the liquid-propellant rocket engine and the rocket power unit may be based on any concept providing for use of kerosene as fuel.

For instance, the proposed invention may be embodied in rocket engine configurations with autonomous turbo-pump unit in fuel and oxidant supply lines, reducing or oxidizing gas generator, etc. In this particular case the engine configuration is of no material importance. What really matters is that the fuel tank of the rocket power unit (incorporated in the rocket engine system or representing a component of the test bench equipment) should be filled with dicyclobutyl to the desired level and that said tank is hydraulically connected to the inlet of the rocket engine fuel supply line. It should be noted that for simplification purposes FIGS. 2 and 3 do not show a number of accessories of the automatic equipment, blowing out system, regulation system, ignition system, tank supercharging system, etc.

It should be noted that the rocket power unit may comprise more than one liquid-propellant rocket engine.

The rocket power unit operates as follows.

The opening of rocket power unit valves 7, 8, 9, 10 (13, 14) in a preset sequence initiates the process in gas generator 5 and further in combustion chambers 6 (15). The latter begin to operate and build up engine thrust notable for a higher specific impulse than the thrust produced by rocket power units using kerosene as fuel. When the engines of the rocket power unit are stopped, its valves, including valves 7, 8, 9, 10 (13, 14) close in a preset sequence. The process in chambers 6 (15) and in gas generator 5 ceases and the engine thrust falls to 0.

What is claimed is:

1. A method for increasing the specific impulse of a liquid-propellant rocket engine comprising the steps of:

using a liquid fuel comprising liquid oxidant and liquid fuel, using liquid oxygen as said liquid oxidant and using liquid hydrocarbon fuel as said liquid fuel wherein dicyclobutyl ($C_8H_4$) is used as the liquid hydrocarbon fuel, a temperature of said dicyclobutyl in a fuel tank of the liquid-propellant rocket ranges within −50° C. to +50° C.

2. A method according to claim 1, wherein the relation Km of said liquid fuel in a combustion chamber of the liquid-propellant rocket engine is maintained within a range of 2.4 to 3.

3. A method according to claim 1 wherein the pressure in the combustion chamber of the liquid-propellant rocket engine is maintained within a range of 50 to 300 kgf/cm$^2$.

4. A rocket power unit comprising at least one liquid-propellant rocket engine, at least one tank for liquid oxidant and at least one tank for liquid fuel, systems for supplying oxidant and fuel and automatic equipment accessories, said tank for liquid fuel containing the required quantity of hydrocarbon fuel as the liquid fuel and said tank for liquid oxidant containing the required amount of liquid oxygen, wherein said tank for liquid fuel is filled with dicyclobutyl ($C_8H_4$).

* * * * *

UNITED STATES PATENT AND TRADEMARK OFFICE
CERTIFICATE OF CORRECTION

PATENT NO.    : 6,415,596 B1  Page 1 of 1
DATED         : July 9, 2002
INVENTOR(S)   : Boris Ivanovich Katorgin et al.

It is certified that error appears in the above-identified patent and that said Letters Patent is hereby corrected as shown below:

<u>Title page,</u>
Item [73], please correct the Assignee information as follows:
-- Otkrytoe Aktsionernoe Obschestvo "NPO Energomash imeni akademika V.P.
-- Glushko, Moskovskaya -- oblast Russia --

Signed and Sealed this

Twenty-ninth Day of July, 2003

JAMES E. ROGAN
*Director of the United States Patent and Trademark Office*